United States Patent

[11] 3,522,791

| [72] | Inventor: | Herman H. Feller<br>3111 Brighton 1st Place, Brooklyn,<br>New York 11235 |
|---|---|---|
| [21] | Application No.: | 784,128 |
| [22] | Filed: | Dec. 16, 1968 |
| [45] | Patented: | Aug. 4, 1970 |

[54] SYSTEM OF PEST CONTROL
8 Claims, Drawing Figs.

[52] U.S. Cl. ............................................. 116/137,
116/147
[51] Int. Cl. ............................................. G10k 7/00
[50] Field of Search ............................................. 116/65,
137, 137A, 67, 22A, 22, 23, 147; 137/consulted;
251/consulted; 73/consulted; 43/consulted

[56] References Cited
UNITED STATES PATENTS
| 2,153,500 | 4/1939 | Eaves ..................... | 116/137 |
| 2,528,026 | 10/1950 | Allen et al. ................ | 116/147 XR |
| 2,730,067 | 1/1956 | Schaufler ................... | 116/137 |
| 2,971,491 | 2/1961 | Yeagley ..................... | 116/137 |
| 3,072,094 | 1/1963 | Cole et al. ................. | 116/147 |
| 3,094,972 | 6/1963 | Leavenworth ........... | 116/147 |
| 3,138,138 | 6/1964 | Quittner .................... | 116/137 |
| 3,188,999 | 6/1965 | Baxter ....................... | 116/137 |

Primary Examiner— Louis J. Capozi
Attorney— Emanuel R. Posnack

ABSTRACT: A system of pest control by the use of ultrasonic means. A high-frequency jet resonator operable by air under pressure is combined with means to produce a continuous series of ultrasonic pulses. In an aspect of this invention for simulating the ultrasonic sounds of a bat in flight around a given area, a plurality of such resonators are placed about the area, a pressure distributor being connected to all the resonators for sequentially setting them off to produce a series of ultrasonic pulses in succession around the area.

INVENTOR
HERMAN H. FELLER
BY
ATTORNEY

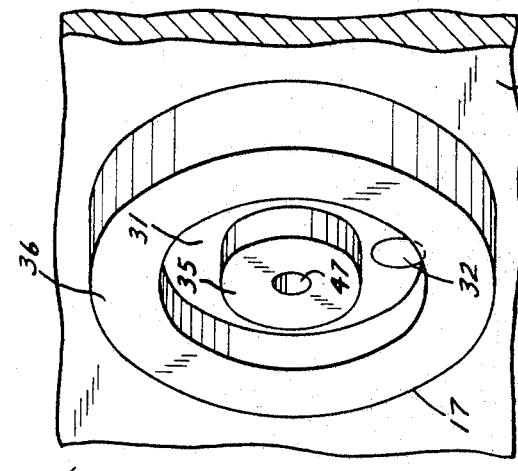
FIG. 6
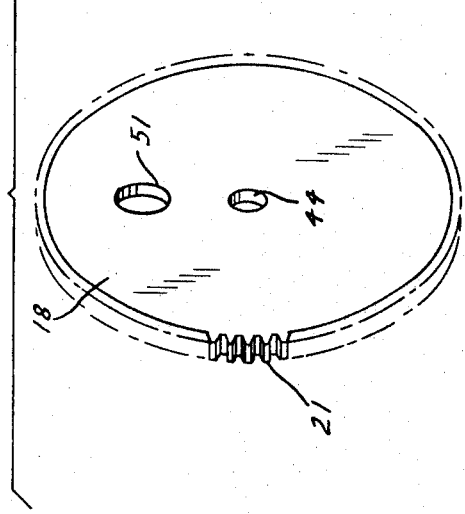
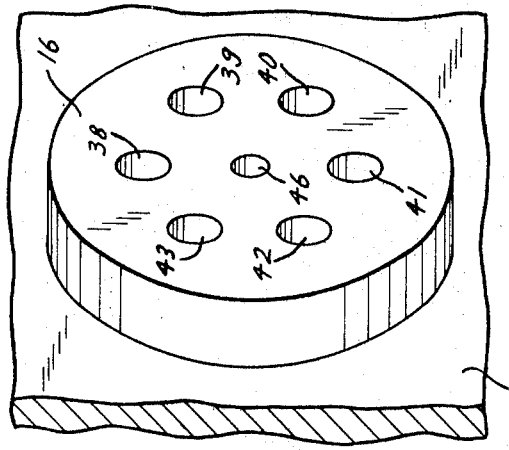
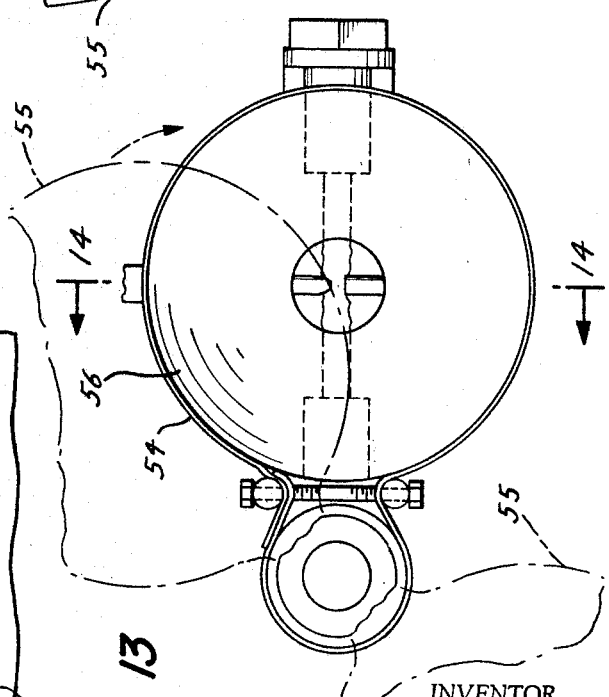
INVENTOR.
HERMAN H. FELLER
BY
Emanuel R. Posnack
ATTORNEY

U.S. PATENT 3,522,791
SYSTEM OF PEST CONTROL

BACKGROUND OF THE INVENTION

THE FIELD OF THE INVENTION

This invention relates to a system for pest control, and is particularly, though not exclusively, directed to the effective employment of ultrasonic sound-producers, such as the jet resolnator described in United States Patent No. 3,188,999, granted June 15, 1965.

THE KNOWN ART

Devices for the production of ultrasonic frequencies, sometimes referred to as ultrasonic whistles, are known to be capable of repelling a wide variety of pest species including, among others, corn earworm moths, cotton bollworms, tobacco budworms, cutworms, etc. Moths with tympanic organs are especially affected by ultrasonic resonators; and it has been noted that among pests of this species subjected to such high-frequency sounds there is a reduction of mating and egg-laying. Ultrasonic sound producers have also been employed to simulate the ultrasonic frequencies of bats to frighten off certain birds and other animals that are destructive of crops.

While there has been a certain measure of success in the employment of the above-mentioned ultrasonic expedients, their full potential has not been realized. The known devices of this category require the expenditure of considerable sound-producing effort, at a cost too high to be feasible for commercial application over widespread areas. And where such known devices are intended to simulate the sounds produced by bats, it has been found that though the proper range of frequencies can successfully be generated, the absence of certain other sound characteristics renders such devices relatively ineffective.

OBJECTIVES OF THE INVENTION

It is an objective of this invention to employ high-frequency means, such as the jet resonator of the above-mentioned patent, in a system that will both increase the efficiency of operation of the sounds produced, and more realistically simulate the sound characteristics of a bat.

I have found that pest control operations by the use of ultrasonics can be rendered more effective by changing the usual continuous sound to a series of short pulses. For example, the pest control efficiency of jet resonators operable by compressed air has been considerably increased by various expedients I have employed to interrupt the sound emissions — the improved results being possibly due to the impact effects of the successive wave pulses striking the pest's tympanic organ. I have also found that the use of bat-simulating sounds can be rendered extremely effective not only by producing a continuous series of ultrasonic pulses, but also by simulating the bat's sound producing action while in flight.

It is within the contemplation of my invention to present relatively simple and easily installed apparatus capable of improving pest control within the scope of the above-mentioned findings.

Other objects, features and advantages will appear from the drawings and the description hereinafter given.

SUMMARY OF THE INVENTION

In the preferred method of practicing this invention I employ an ultrasonic resonator like that disclosed in said Pat. No. 3,188,999 operatively connected to my novel fluid-pressure pulse generator which in turn is connected to a source of fluid supply, such as a compressor. The said pulse generator comprises a casing containing a rotatable disc which separates the casing into front and rear sections, the rear section having a compartment communicating through a suitable pipe with said compressor, the front section containing a plurality of passageways arranged in a circle. The said disc operates as a valve member having a single aperture therein positioned for successive registry with said passageways in said front section during the operative rotation of the disc, said aperture being at all times in communication with said rear section compartment. At least one of said passageways is connected, through suitable piping, with a jet resonator. The arrangement is hence such that the operative rotation of the disc — driven by means to be later described — 175 will cause a pulse of air from the compressor to drive the resonator each time the disc aperture comes into registry with the passageway that is connected with the resonator.

In that aspect of my system applicable to an extended area, and especially when it is desired to simulate the sound of a bat in flight, a plurality of such resonators are positioned at spaced points around the selected area, all of said resonators being connected by suitable piping to said respective passageways in the casing's front section. The pulse generator unit now also serves as a pressure distributor, the operative rotation of the disc successively setting off pulses of ultrasonic sounds from the resonators arranged around the area, thereby simulating the ultrasonic pulses of a bat circling the area.

The interruptions for producing pulses of sound can be produced either by distributor means connected through piping to the various sound producing units, or by other separate means directly connected or in close proximity to each unit, such as a rotatably mounted fan-like blade positioned in front of the sound producer, all as will more fully appear from the description hereinafter given.

DESCRIPTION OF THE DRAWINGS

FIG. 6 represents an exploded view of the front and rear sections and the rotatable disc of the said pulse generator, said components being shown in perspective.

FIG. 11 is a diagrammatic plan view of an area containing a system of six spaced resonators operatively connected to the pulse generator and associated parts shown in FIG. 1.

FIG. 12 is a plan view of a modified form of my invention showing a resonator unit having thereon a fan-like pulse-generator.

FIG. 13 is an enlarged fragmentary front view of FIG. 12.

FIG. 14 is a fragmentary section of FIG. 13 taken along line 14-14.

DESCRIPTION OF PREFERRED EMBODIMENTS

Figure 1:
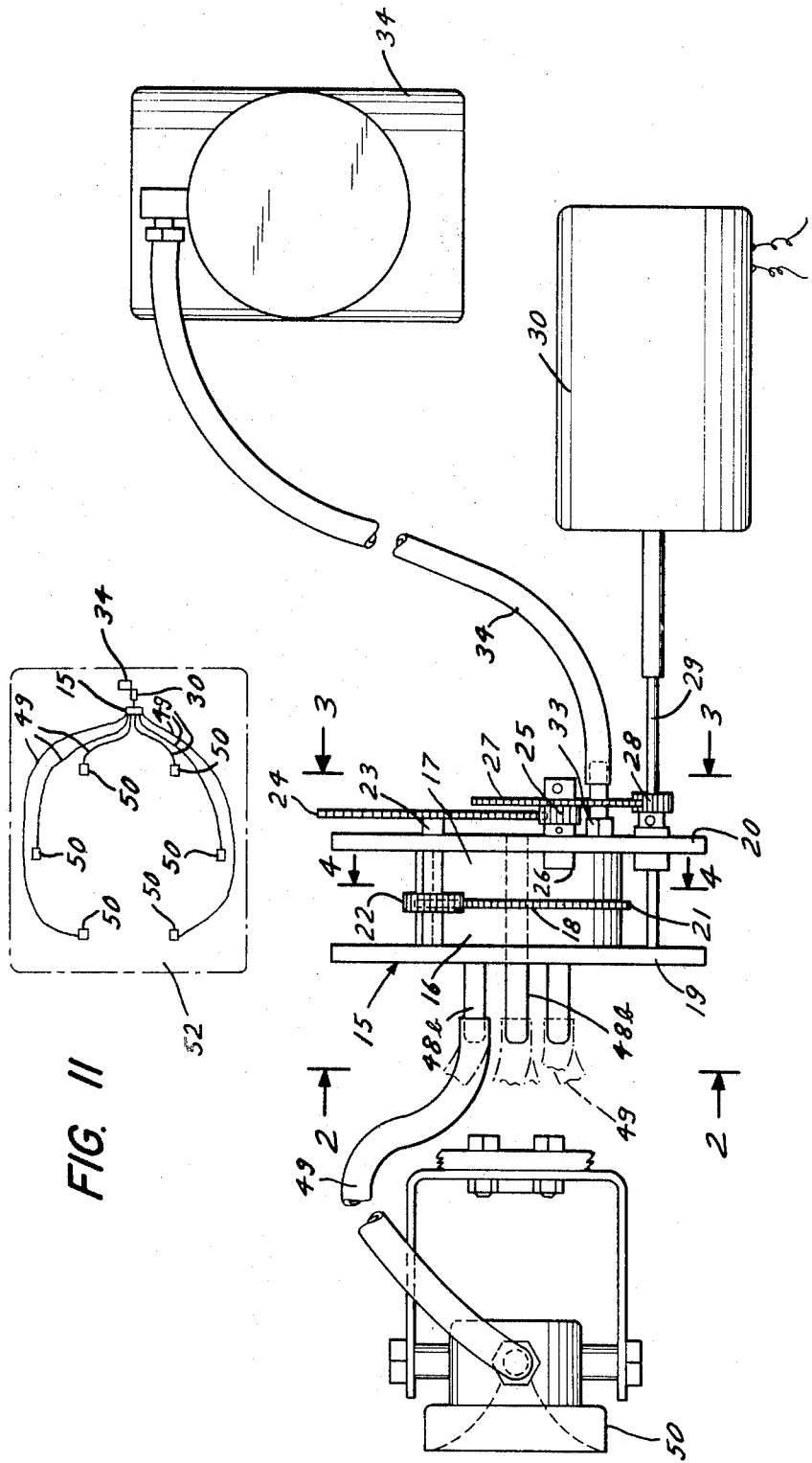
FIG. 1 is a fragmentary plan view of a pulse generator according to a preferred form of my invention, shown operatively connected to a motor, a compressor and one of a number of jet resonators, the dot-dash lines indicating portions of pipes leading to other resonators not shown.
Figure 2:
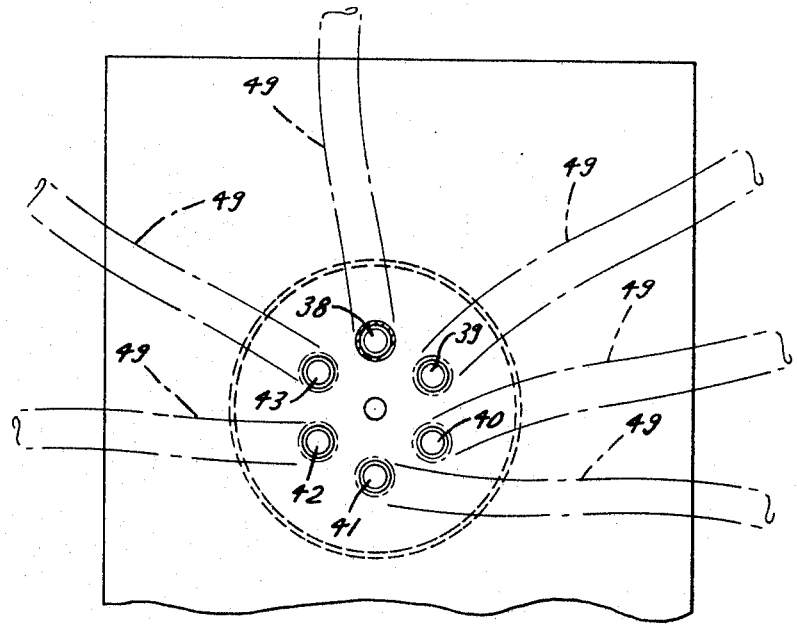
FIG. 2 is a fragmentary front sectional elevation of FIG. 1 taken substantially along line 2-2, the dot-dash lines indicating portions of pipes leading to a plurality of resonators.
Figure 3:
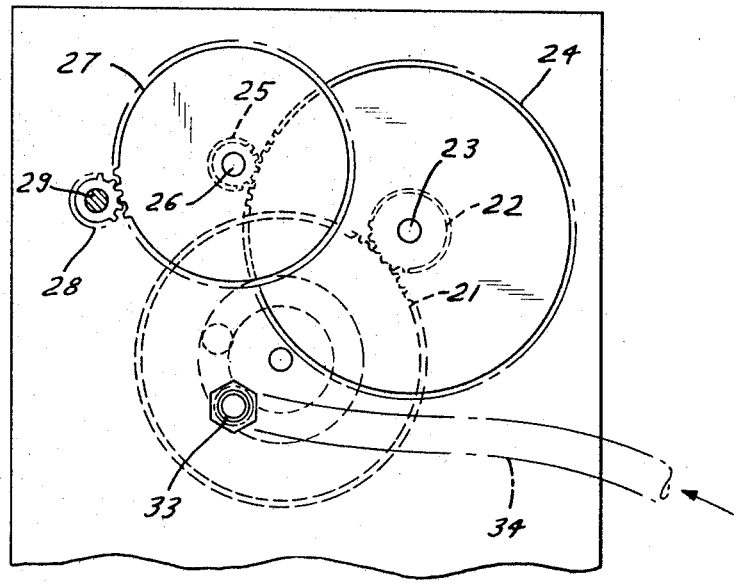
FIG. 3 is a fragmentary rear sectional elevation of FIG. 1 taken substantially along line 3-3, the dot-dash lines indicating the pipe leading to the compressor.
Figure 5:
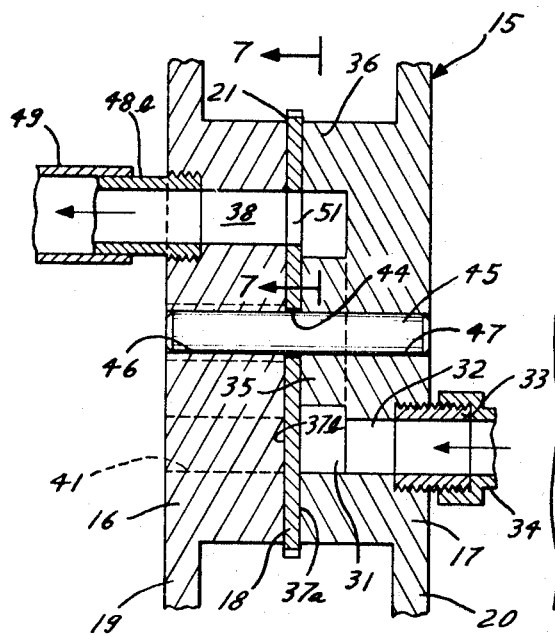
FIG. 5 is a fragmentary section of FIG. 4 taken along line 5-5, but showing the rotary disc in a non-blocking position, and showing a fragmentary portion of one pipe fitting and pipe operatively in place.

In the embodiment of my invention illustrated in FIGS. 1 to 11, the pulse generator and distributor unit generally designated by the reference numeral 15 is a casing comprising the respective front and rear sections 16 and 17 separated by the rotatable disc 18, said sections having the respective flanges 19 and 20 connected together by fastening means not shown but known to those skilled in the art. The outer periphery of said disc, protruding beyond said sections, comprises an arrangement of gear teeth 21 engaged by the pinion 22 mounted on the shaft 23 which carries the gear 24 meshing with the pinion 25 which is affixed to shaft 26, the latter carrying the gear 27 in engagement with the gear 28 mounted on the shaft 29 connected to the motor 30. The above described train of gears is designed to produce a predetermined speed of rotation of the said disc 18 depending on specific requirements.

The said rear section 17 of casing 15 contains an internally recessed ring-like pressure compartment 31 communicating with the duct 32 to which is connected the fitting 33, the pipe 34 connecting said fitting with the compressor 34. The center boss 35 of said rear section 17 and the peripheral wall 36 thereof, which define said compartment 31, extend forwardly to the rear surface 37a of said rotary disc 18, so that during the operative rotation of said disc its said surface 37a is in slidable engagement with said boss 35 and peripheral wall 36.

The front section 16 of said casing 15 has a plurality of passageways 38, 39, 40, 41, 42 and 43 arranged in a circle, each passageway extending parallel to the axis of rotation of said disc 18. The latter is centrally apertured at 44 and is rotatably mounted over the shaft 45 extending through and supported by the longitudinally aligned central apertured portions 46 and 47. The front surface 37b of said disc is in slidable engagement with the rear body portion of said section 16, whereby said passageways are not in communication with each other.

Operatively connected to each of said passageways is a pipe fitting 48b, said latter fittings being adapted for connection by pipes 49 to respective sound-producing devices like the jet resonator 50, similar to the resonator described in the above-mentioned Patent No. 3,188,999. For the purpose of this specification it is sufficient to note that said device 50 produces ultrasonic sounds, of the frequency required for pest control, under the action of fluid pressure, such as air conveyed to it from a compressor.

The said rotary disc 18 has an aperture 51 positioned on a circumference congruent with that of said passageways 38 to 43 inclusive, so that said aperture 51 will successively be brought into registry with said passageways during said disc's operative rotation. Said aperture 51 is also at all times in communication with said ring-like compartment 31 of said rear section 17, the proportions of said compartment being such that a portion thereof is exposed to said aperture 51 in all positions of said disc 18.

Figure 4:
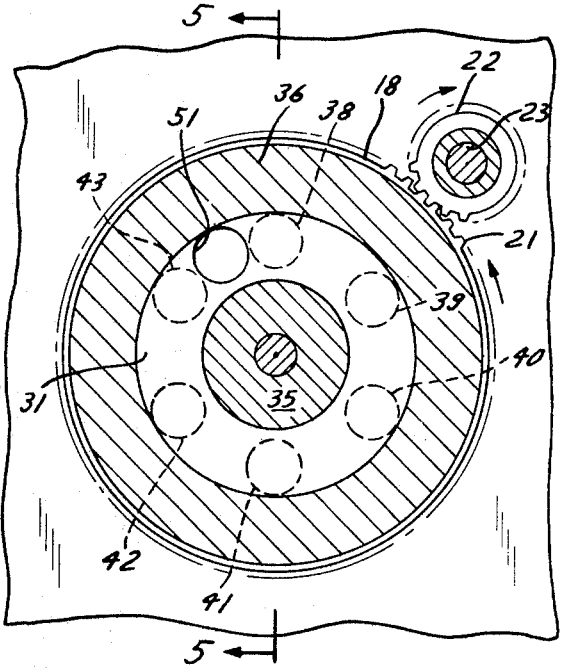
FIG. 4 is a fragmentary section of FIG. 1 taken along line 4-4, showing the rotary disc in a communication-blocking position.
Figure 8:
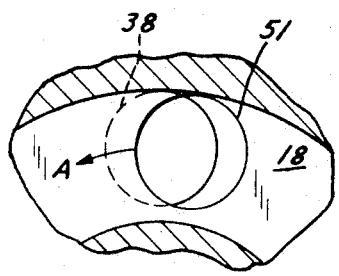
FIG. 8 is a view like FIG. 7, but showing a greater portion of said disc aperture in registry with said passageway as the disc has advanced from the position of FIG. 7.
Figure 7:
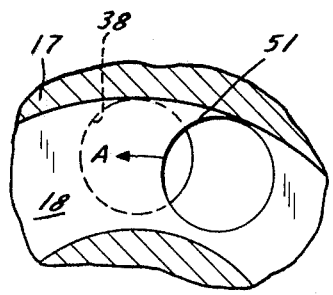
FIG. 7 is a somewhat enlarged fragmentary section, taken substantially along line 7-7 of FIG. 5, showing the rotary disc in an approaching position at which its aperture is in initial partial registry with one of the passageways of the front section connected to a resonator.
Figure 10:
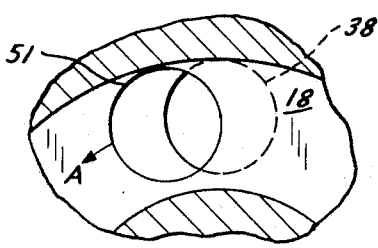
FIG. 10 is a view like FIGS. 7-9 but showing the disc aperture in partial registry with said passageway in a position subsequent to that shown in FIG. 9.

Upon the operative rotation of disc 18 under the driving action of said motor 30, air under pressure from compressor 34 will be directed by pipe 34 into said compartment 31; and when the apertured portion 51 comes into registry with one of said passageways, such as passageway 38 (FIG. 5), the air will enter said passageway and be directed by pipe 49 to the connected resonator 50. Since said disc 18 is continuously rotating, there will be pulses of ultrasonic sound emitted from the resonators 50 connected to said respective passageways. It is to be noted that when the disc's said aperture 51 is out of registry with any of said passageways, as indicated in FIG. 4, the resonators are blocked and out of communication with said pressure compartment 31, and all resonators are accordingly silent. Hence, during each revolution of disc 18 there are as many pulses, for the embodiment shown in the drawings, as there are resonators connected to said passageways. If only one resonator were connected, there would be only one pulse per revolution; and in such an arrangement it would be desirable to plug the non-operative passageways.

By referring to FIG. 11 it will be seen that there are six resonators 50 in the area designated 52, arranged at spaced points around the area and connected by pipes 49 to the pulse generator and distributor 15. Since, as aforesaid, these resonators are positioned for sequential connection with said pressure compartment 31, there will be produced a succession of ultrasonic pulses giving the effect of a bat circling the plot 52.

Figure 9:
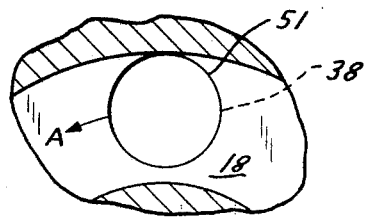
FIG. 9 is a view like FIGS. 7 and 8, but showing the disc aperture and said passageway in full registry.

It should be further noted that as the disc 18 rotates, its said aperture 51 comes into progressively increasing and then progressively decreasing overlapping relation with the respective coacting passageways. Thus, by referring to FIG. 7, it will be seen that the aperture 51 is only in slightly overlapping registry with said passageway 38; in FIG. 8 it is in greater overlapping registry. In FIG. 9 it is in full registry. As the disc 18 continues to rotate in the direction of arrow A, the overlapping registry becomes progressively less until there is no longer any registry. The amount of fluid pressure operatively applied to the resonator is, for each pulse, first relatively small, gradually increasing to maximum intensity, and then decreasing to zero. The loudness of the emitted sound thus varies from low to loud to low again, thereby producing the effect of a bat approaching and then departing, thus greatly adding to the realistic effect of a bat circling the area.

In the form of my invention illustrated in FIGS. 12 to 14, inclusive, the resonator 50 has attached thereto a pulse generator in the form of a bladed member 53 mounted by band 54 around the body of the resonator, the blades 55 being disposed in front of the horn 56 of the resonator. The operative rotation of the blades 55 will produce pulse-like interruptions of the emitted sound, thereby increasing the pest-control efficiency of the resonator, in the manner above mentioned.

In the above description, the invention has been disclosed merely by way of example and in preferred manner; but obviously many variations and modifications may be made therein. It is to be understood, therefore, that the invention is not limited to any form or manner of practicing same, except insofar as such limitations are specified in the appended claims.

I claim:

1. A pest control device comprising a fluid-pressure resonator for producing a high-frequency sound, a source of fluid supply operatively connected to said resonator, and cyclical interrupting means operatively connected to said resonator for interrupting the sound thereof at predetermined intervals, conduit means interposed between and communicating with said resonator and said source of fluid supply, said cyclical interrupting means having a valve member disposed within said conduit means and operatively movable between open and closed positions, whereby the fluid from said source reaches said resonator in pulses, said valve member comprising a rotatably mounted disc with an eccentrically positioned apertured portion therein positioned and proportioned for communication with said conduit means when said member is in said open position, said disc having a wall portion in intercepting relation with said conduit means when in said closed position.

2. A pest control device comprising a fluid-pressure resonator for producing a high-frequency sound, a source of fluid supply operatively connected to said resonator, and cyclical interrupting means operatively connected to said resonator for interrupting the sound thereof at predetermined intervals, said cyclical interrupting means comprising a casing having front and rear sections and a rotatable disc between said sections, one of said sections having a compartment communicating with said source of fluid supply, the other of said sections having a passageway communicating with said resonator, means to operatively rotate said disc, said disc having an apertured portion positioned and proportioned for communication with both said compartment and passageway once during each revolution of the disc, whereby the fluid from said source reaches said resonator in pulses.

3. A pest control device according to claim 2, said compartment being proportioned and positioned for continuous communication with said apertured portion of the disc, said passageway being proportioned and positioned for communication with said apertured portion only at a predetermined part of the disc's operative rotation.

4. A pest control device according to claim 3, said disc being in rotatable engagement with the respective adjacent portions of said front and rear sections of the casing, said compartment being of substantially ring-like configuration and being disposed adjacent said disc, said section containing said compartment having a duct communicating between said ring-like compartment and said source of fluid supply.

5. A pest control device according to claim 2, said disc having an outer periphery provided with gear teeth, said means to rotate said disc comprising geared means operatively connected to said gear teeth and to suitable motor means.

6. A system of pest control comprising a plurality of fluid-pressure resonators for producing high-frequency sounds, said resonators being positioned in spaced relation within a selected area, a source of fluid supply, and sequential pressure distributor means communicating between said source of fluid supply and said resonators for sequentially actuating them in predetermined succession, said pressure distributor means having a plurality of conduits connected to said respective resonators, a pipe connected to said source of fluid supply, and a valve member connected to said pipe and movable into successive opening positions with respect to said respective conduits, whereby pulses of fluid pressure from said source will successively pass through said conduits to actuate the respective connected resonators.

7. A system of pest control according to claim 6, said pressure distributor means comprising a casing having front and rear sections and a rotatable disc between said sections, one of said sections having a compartment communicating with said source of fluid supply, the other of said sections having a plurality of passageways arranged in a circle and communicating with said respective resonators, means to operatively rotate said disc, said disc having an apertured portion positioned and proportioned for successive registry with said passageways during the operative rotation of the disc, said apertured portion of the disc being in continuous communication with said compartment, whereby during each revolution of said disc pulses of fluid pressure from said source will successively actuate the resonators communicating with said respective passageways.

8. A system of pest control according to claim 7, said apertured portion of said disc being of circular configuration, and said respective passageways having orifices of circular cross-section positioned for coactive overlapping registry with said apertured portion of the disc during its operative rotation.